United States Patent [19]

Murakami

[11] Patent Number: 4,868,671
[45] Date of Patent: Sep. 19, 1989

[54] METHOD OF AND APPARATUS FOR NOISE REDUCTION IN MULTI-GRADATION IMAGE SIGNAL IN HALFTONE IMAGE READER

[75] Inventor: Shigeo Murakami, Kyoto, Japan

[73] Assignee: Dainippon Screen Mfg. Co., Ltd., Kyoto, Japan

[21] Appl. No.: 136,487

[22] Filed: Dec. 21, 1987

[30] Foreign Application Priority Data

Dec. 19, 1986 [JP] Japan ................ 61-304736

[51] Int. Cl.⁴ ............................................. H04N 1/40
[52] U.S. Cl. ...................................... 358/447; 358/400
[58] Field of Search .............................. 358/256, 284

[56] References Cited

U.S. PATENT DOCUMENTS

| | | | |
|---|---|---|---|
| 4,005,475 | 1/1977 | Knop | 358/80 |
| 4,054,916 | 10/1977 | Knop | 358/284 |
| 4,237,481 | 12/1980 | Aughton | 358/284 |
| 4,279,003 | 7/1981 | Schulz | 358/284 |
| 4,315,318 | 2/1982 | Kato et al. | 358/284 |
| 4,317,179 | 2/1982 | Kato et al. | 358/284 |
| 4,335,407 | 6/1982 | Atoji et al. | 358/284 |
| 4,346,409 | 8/1982 | Ishida et al. | 358/284 |
| 4,484,232 | 11/1984 | Gast | 358/284 |
| 4,521,812 | 6/1985 | Knop | 358/284 |
| 4,536,803 | 8/1985 | Hennig | 358/284 |
| 4,591,923 | 5/1986 | Urabe et al. | 358/284 |
| 4,785,347 | 11/1988 | Ezuka et al. | 358/284 |

FOREIGN PATENT DOCUMENTS

| | | | |
|---|---|---|---|
| 60-236580 | 11/1985 | Japan | 358/284 |
| 2165717 | 4/1986 | United Kingdom | 358/284 |
| 2170373 | 7/1986 | United Kingdom | 358/284 |

*Primary Examiner*—James J. Groody
*Assistant Examiner*—Randall S. Svihla
*Attorney, Agent, or Firm*—Lowe, Price, LeBlanc, Becker & Shur

[57] ABSTRACT

A multi-gradation image signal obtained by multi-gradationization of a signal obtained by reading through a CCD an original having a half tone is supplied to an unsharp signal producing part, which in turn outputs an unsharp signal produced from the multi-gradation image signal and the multi-gradation image signal itself. A comparator discriminates a shadow portion of the original by comparing the multi-gradation image signal with a reference value. As a result, a signal which is unsharp in the shadow portion of the original is produced from the multi-gradation image signal and the unsharp signal.

12 Claims, 5 Drawing Sheets

METHOD OF AND APPARATUS FOR NOISE REDUCTION IN MULTI-GRADATION IMAGE SIGNAL IN HALFTONE IMAGE READER

BACKGROUND OF THE INVENTION

1. Field of the Invention

The present invention relates to a method of and an apparatus for noise reduction in a multi-gradation image signal obtained by mating multi-gradationed a signal obtained by reading, through a solid-state image sensing element, an original having a half tone such as a photograph or a photofilm.

2. Description of the Prior Art

When an original having a half tone is read through a solid-state image sensing element, such as a CCD, the half tone cannot be correctly read as compared with the case of employing an image sensing tube or a photomultiplier, because of noise caused by the element itself. In order to solve such a problem, an effort has been made to reduce the noise caused by the element itself, whereas no sufficient effect has been attained since the mechanism of noise generation is not yet sufficiently understood. Since it is difficult to reduce the noise caused by the element itself, influence by the noise thus caused has been generally weakened by signal processing in, e.g., a method of reading the same portion of an original a plurality of times to average image signals of an identical pixel thereby to reduce the noise. In this case, the amount of random noise is $$1/\sqrt{n},$$

for n readings. In this method, however, the reading speed is decreased since the same portion of the original must be read a plurality of times. On the other hand, the noise can also be reduced from an image signal obtained by one reading by performing averaging between adjacent pixels, although resolution is reduced in this case.

SUMMARY OF THE INVENTION

The present invention is directed to a method of and an apparatus for reducing noise in a multi-gradation image signal obtained by making multi-gradationed a signal obtained by reading, through a solid-state image sensing element, an original having a half tone.

According to the present invention, an unsharp signal is produced from a multi-gradation image signal, while the multi-gradation image signal is compared with a prescribed reference value to discriminate a shadow portion of an original. As a result, a signal that is unsharp in the shadow portion of the original is produced from the multi-gradation signal and the unsharp signal.

Human vision has a characteristic (e.g., being sensitive to change in brightness in darker places) which is similar to a logarithm such that noise is more conspicuous in a shadow portion of an image than it is in a highlight portion. This tends to prevent correct reproduction of gradation when the same amounts of noise are mixed into the highlight portion and the shadow portion. In addition, reduction in picture quality is not perceived even if resolution is slightly reduced in the shadow portion since human vision merely has low spatial resolution in the shadow portion. The present invention accordingly reduces noise with only one reading without reducing resolution for human eyes by producing an unsharp signal by, e.g., performing averaging between adjacent pixels only in a shadow portion of an image and outputting the same.

Accordingly, an object of the present invention is to overcome the aforementioned disadvantages of the prior art and provide a method of and an apparatus for noise reduction, which can reduce noise of a multi-gradation signal obtained by reading through a solid-state image sensing element, such as a CCD, without lowering the reading speed and without reducing resolution for human eyes.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
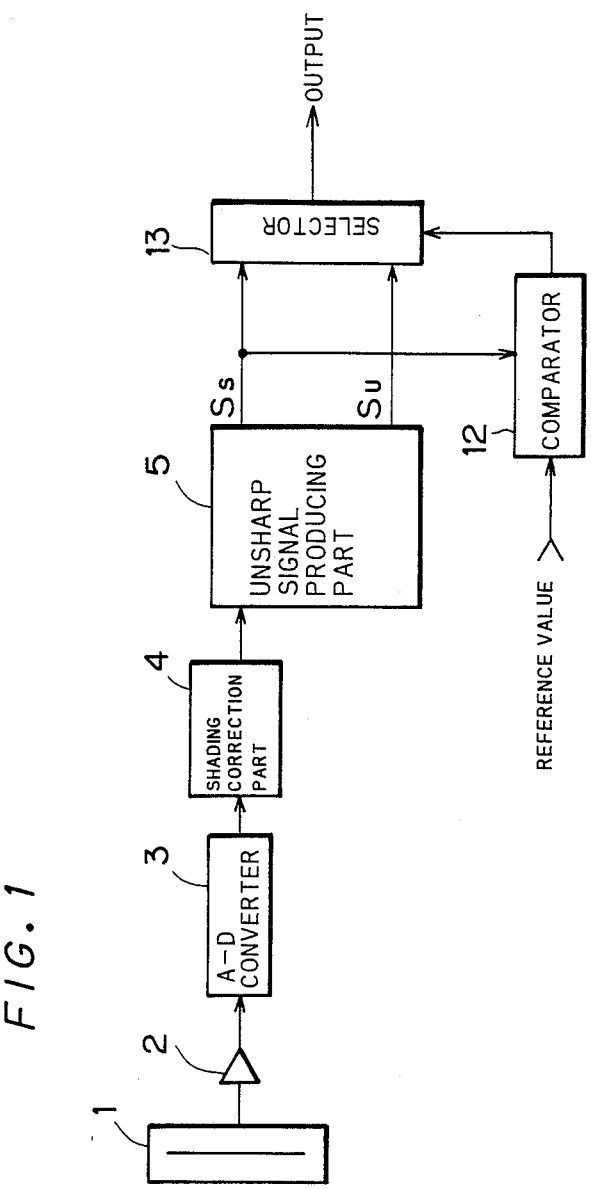
FIG. 1 is a block diagram showing an embodiment of the present invention.

FIG. 1 is a block diagram showing an embodiment of the present invention. Referring to FIG. 1, a solid-state image sensing element 1, such as a CCD, photoelectrically scans an original (not shown) having a halftone to output an analog image signal responsive to variable density of the scanned portion in a time-series manner. The analog image signal is amplified by an amplifier 2 and digitally converted by an A-D converter 3 into a multi-gradation image signal, to be subjected to well-known shading correction in a shading correction part 4 for correcting dispersion in sensitivity of each pixel.

Figure 2:
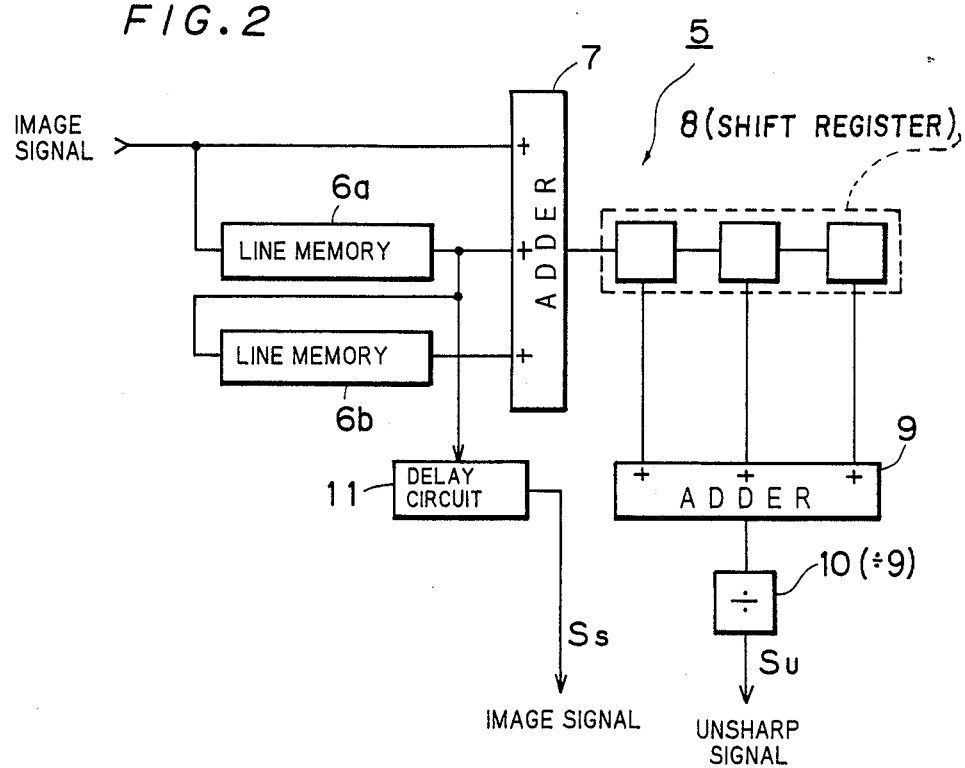
FIG. 2 is a block diagram showing an example of an unsharp signal producing part.

An unsharp signal producing part 5 receives the shading-corrected image signal to produce an unsharp signal $S_U$. FIG. 2 is a block diagram showing an example of the unsharp signal producing part 5, which is adapted to produce an unsharp signal $S_U$ of a central pixel from an average value of a 3×3 pixel region. Namely, an inputted image signal is delayed by one scanning line and two scanning lines, respectively, by line memories 6a and 6b, and the delayed image signals and the inputted image signal (i.e., image signals for three pixels arranged in the subscanning direction) are added up in an adder 7. The result of addition is shifted in the main scanning direction by three pixels by a shift register 8, subjected to further addition in an adder 9, and divided by 9 by a divider 10, so that the average value of the 3×3 pixel region is calculated to be outputted as the unsharp signal $S_U$ for the central pixel of the region. On the other hand, a raw image signal $S_S$ for the central pixel of the 3×3 pixel region is outputted through the line memory 6a and a delay circuit 11 with the same timing as the unsharp signal $S_U$.

A comparator 12, shown in FIG. 1, compares the image signal $S_S$ with a prescribed reference value to determine whether or not the pixel corresponds to a shadow portion. The result of comparison is supplied as a selection signal to a selector 13, which responsively selects the unsharp signal $S_U$ when the pixel corresponds to a shadow portion while selecting the image signal $S_S$ when the pixel does not correspond to a shadow portion, to output the same. Thus, noise is reduced only in a shadow portion particularly requiring noise reduction, and although theoretical resolution is slightly reduced, lowering of quality is hardly visually recognized in such a shadow portion. While noise reduction is performed only in the shadow portion, noise in other portions is not conspicuous to human eyes for the aforementioned reason. Further, since scanning may be performed only once, the reading speed is not lowered, as a matter of course.

Figure 3:
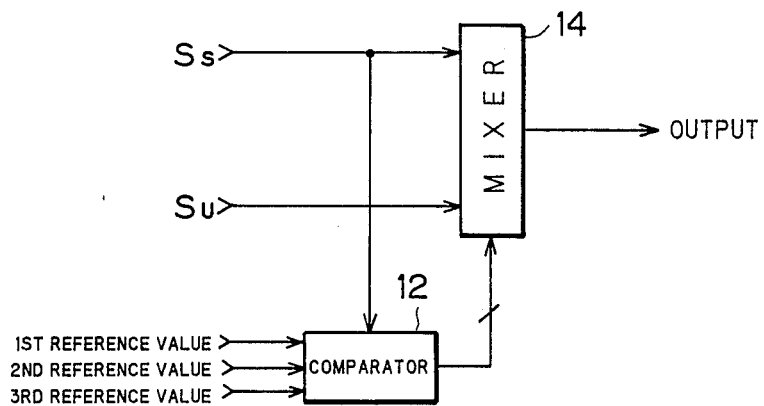
FIGS. 3 and 4 are block diagrams showing modifications of the embodiment of FIG. 1.

Although the comparator 12 has only one reference value in the embodiment shown in FIG. 1, the same may have a plurality of reference values, as shown in FIG. 3 (first to third reference values in FIG. 3). In this case, the results of comparison in the comparator 12 are in multiple stages (number of reference values +1: four stages in FIG. 3). The selector 13 shown in FIG. 1 is replaced by a mixer 14, which is adapted to mix the image signal $S_S$ and the unsharp signal $S_U$ in response to the results of comparison of the comparator 12 in, for example, the following ratios:

| Result of Comparison | $S_S$ | $S_U$ |
| --- | --- | --- |
| above first reference value | 100% | 0% |
| first to second reference value | 70% | 30% |
| second to third reference value | 40% | 60% |
| below third reference value | 0% | 100% |

Noise reduction is thus performed in a staged manner, to enable finer noise control.

Figure 4:
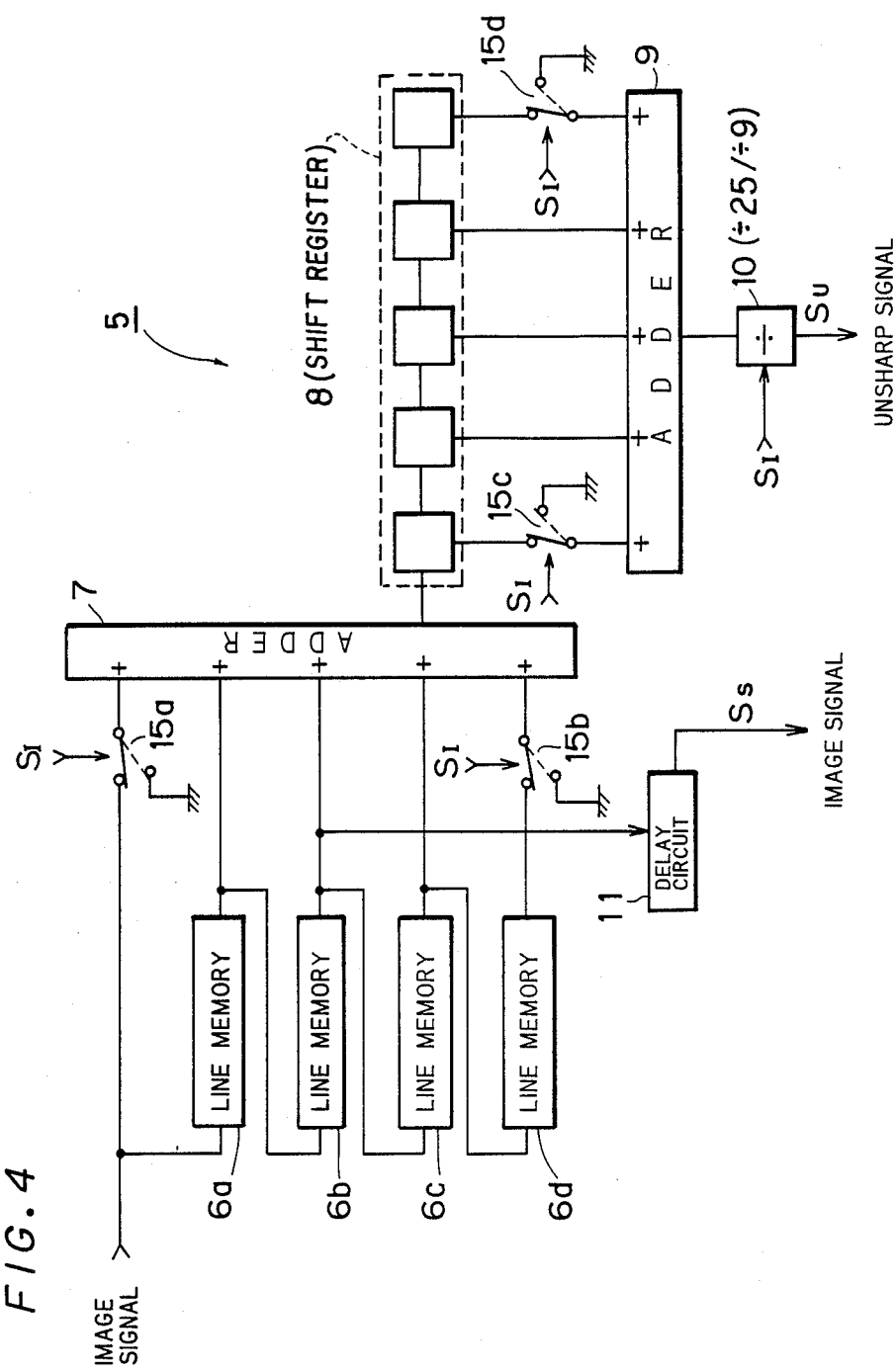

Although the unsharp signal $S_U$ is produced from the average value of the 3×3 pixel region in the unsharp signal producing part 5 shown in FIG. 2, the range of pixels to be averaged may be arbitrarily selected as shown in FIG. 4.

Referring to FIG. 4, line memories 6c and 6d are provided in addition to line memories 6a and 6b, so that an adder 7 adds up image signals for five pixels arranged in the subscanning direction and the results of addition are shifted in the main scanning direction by five pixels in a shift register 8, added in an adder 9 and further divided by 25 in a divider 10, thereby to obtain an average value of a 5×5 pixel region as an unsharp signal $S_U$. Further, switches 15a to 15d are provided for blocking image signals of pixels corresponding to the closest periphery of the 5×5 pixel region so that the switches 15a to 15d are cut off, as shown by dotted lines in the figure, in response to a command signal $S_I$. The divisor of the divider 10 is simultaneously changed from 25 to 9 in response to the command signal $S_I$ to perform division by 9, whereby the average value of a 3×3 pixel region can be selectively obtained as an unsharp signal $S_U$. Further, for example, the aforementioned command signal $S_I$ may be so provided that the range of average pixels is further expanded (from 3×3 pixel region to 5×5 pixel region in the case of FIG. 4) in a portion closer to a black level in a shadow portion on the basis of the results of comparison in the comparator 12 shown in FIG. 3 having a plurality of reference values, whereby noise is reduced in a staged manner to enable finer noise control.

Figure 5:
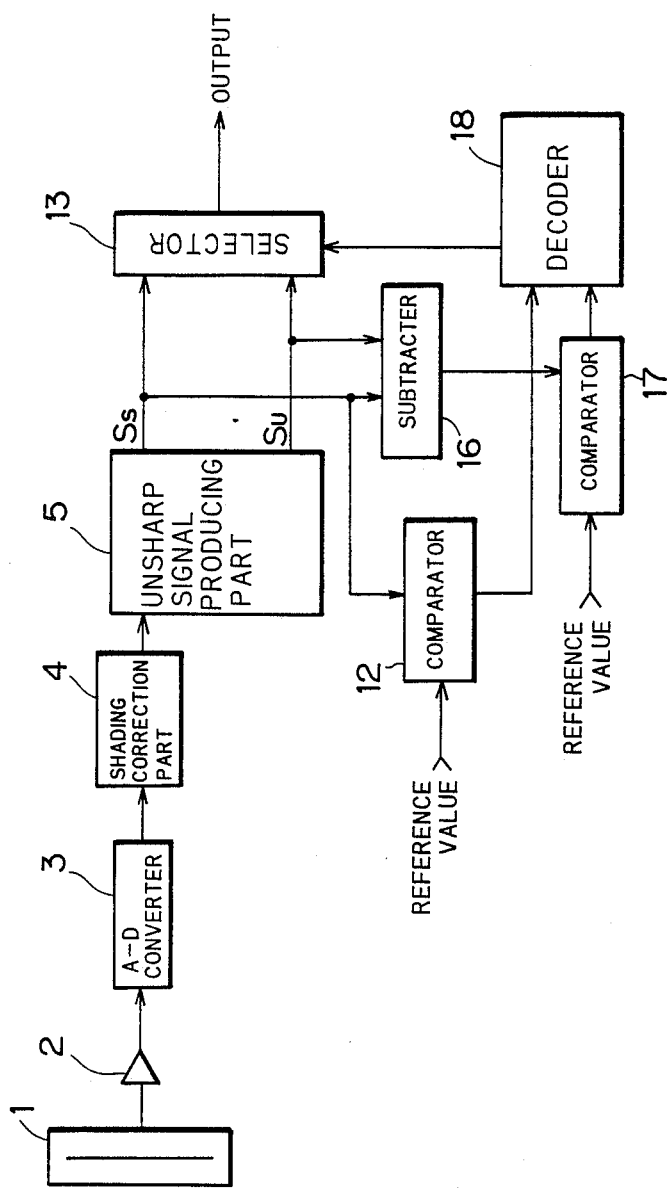
FIG. 5 is a block diagram showing another embodiment of the present invention.

FIG. 5 is a block diagram showing another embodiment of the present invention. This embodiment is newly provided with a subtracter 16 which obtains the difference between an image signal $S_S$ and an unsharp signal $S_U$ thereby to derive a contrast signal expressing density integration in the vicinity of a noted pixel. A comparator 17 compares the contrast signal with a prescribed reference value to determine whether the noted pixel is close to a smooth portion (i.e., a portion of small density inclination) or a sharp portion (i.e., a portion of steep density inclination), and a decoder 18 decodes the results of comparison in the comparators 12 and 17 to supply the same to a selector 13 as a selection signal. The other portions of this embodiment is similar to those of the embodiment of FIG. 1.

In the embodiment of FIG. 5, the results of comparison of the comparators 12 and 17 are divided into the following four items:
 (a) highlight portion, smooth
 (b) highlight portion, sharp
 (c) shadow portion, smooth
 (d) shadow portion, sharp Within these, lowering of resolution is most inconspicuous in the smooth shadow portion of the item (c). Therefore, when the decoder 18 supplies the selection signal to the selector 13 so that the same outputs the unsharp signal $S_U$ in place of the image signal $S_S$ only in the portion of the item (c), for example, noise can be reduced while further preventing apparent lowering of quality caused by theoretical lowering of resolution. Further, noise can be reduced in response to the type of the image by appropriately selecting in which portion of (a) to (d) the unsharp signal is to be outputted in response to the type of the original or the like.

Figure 6:
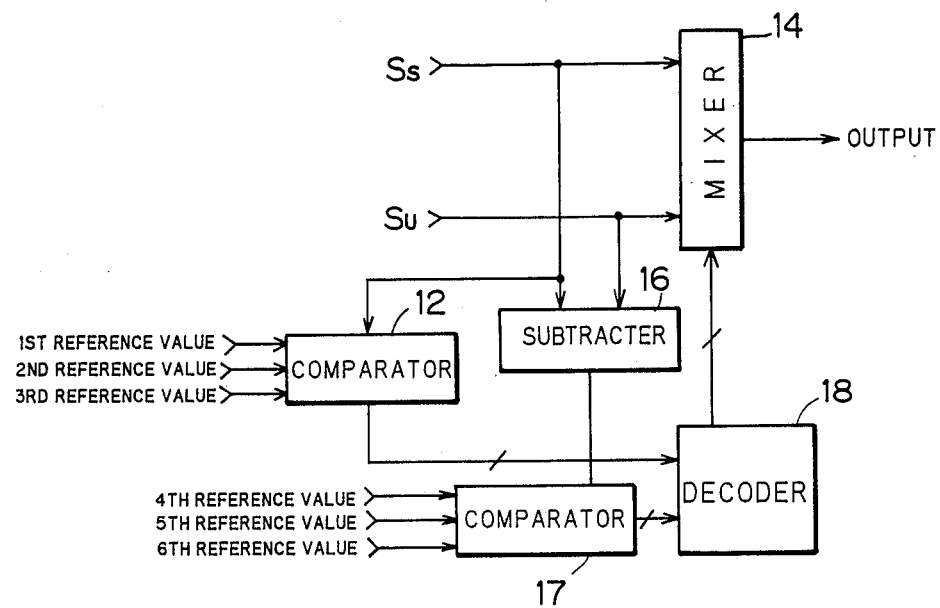
FIG. 6 is a block diagram showing a modification thereof.

FIG. 6 shows a modification of the embodiment shown in FIG. 5, which modification corresponds to that of FIG. 3 for the embodiment of FIG. 1. Namely, pluralities of reference values (three for each in FIG. 6) are set in comparators 12 and 17, and a decoder 18 decodes results of comparison of four stages each to supply 4×4=16 mixing indication signals to a mixer 14. The mixer 14 responsively mixes an image signal $S_S$ and an unsharp signal $S_U$ at a prescribed ratio (such that, in general, the ratio of the unsharp signal is increased with increase in shadow content as well as in smoothness) to output the same. Thus, finer noise control is enabled by performing noise reduction in larger stages.

Although the unsharp signal is obtained by simple additional means in the aforementioned embodiments, a method of obtaining an unsharp signal by weighted additional means is also applicable to the present invention, as a matter of course.

According to the present invention as hereinabove described, noise of a multi-gradation image signal obtained by reading through a solid-state image sensing element, such as a CCD, can be effectively reduced without lowering the reading speed since reading may be performed only once and without rendering lowering of resolution, conspicuous as a reduction of quality, since consideration is made on the characteristic of human vision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for reducing noise in a multi-gradation image signal obtained by making multi-gradationed a signal obtained by reading with a solid-state image sensing element an original having a half tone, said method comprising the steps of:

producing an unsharp signal from said multi-gradation image signal;

comparing said multi-gradation image signal with at least one prescribed reference value to discriminate whether a portion of said original is a shadow portion and producing a signal that is unsharp from at least one of said multi-gradation image signal and said unsharp signal when said portion is discriminated to be a shadow portion.

2. A method in accordance with claim 1, wherein said at least one prescribed reference value is a single reference value, and said step of producing said signal that is unsharp is performed by selecting said unsharp signal when said portion is discriminated to be a shadow portion.

3. A method in accordance with claim 1, wherein said at least one prescribed reference value is a plurality of reference values, and said step of producing said signal that is unsharp is performed by mixing said multi-gradation image signal and said unsharp signal in one of a plurality of prescribed ratios when said portion is discriminated to be a shadow portion.

4. A method in accordance with claim 1, further including the steps of:

producing a contrast signal by taking the difference between said multi-gradation image signal and said unsharp signal ; and comparing said contrast signal with at least one prescribed reference value to discriminate whether said portion of said original is a low-contrast portion;

wherein said signal that is unsharp is produced when said portion is discriminated to be a low-contrast shadow portion.

5. A method in accordance with claim 1, wherein said step of producing the unsharp signal is performed by averaging said multi-gradation image signal over a prescribed area of said original.

6. A method in accordance with claim 5, wherein said at least one prescribed reference value is a plurality of reference values, and said prescribed area is changed in size when said portion is discriminated to be a shadow portion.

7. An apparatus for reducing noise in a multi-gradation image signal obtained by making multi-gradationed a signal obtained by reading with a solid-state image sensing element an original having a halftone, said apparatus comprising:

unsharp signal producing means for producing an unsharp signal from said multi-gradation image signal;

first comparing means for comparing said multi-gradation image signal with at least one prescribed reference value to discriminate whether a portion of said original is a shadow portion ; and signal producing means for producing a signal that is unsharp from at least one of said multi-gradation image signal and said unsharp signal in response to said first comparing means indicating that said portion is discriminated to be a shadow portion.

8. An apparatus in accordance with claim 7, wherein said at least one prescribed reference value is a single reference value, and said first comparing means includes means for comparing said multi-gradation image signal with said single reference value, and said signal producing means includes means for selecting said unsharp signal in response to a shadow portion discriminated by said first comparing means.

9. An apparatus is accordance with claim 7, wherein said at least one prescribed reference value is a plurality of reference values, and said first comparing means includes means for comparing said multi-gradation image signal with said plurality of reference values, and said signal producing means includes means for mixing said multi-gradation image signal and said unsharp signal in one of a plurality of prescribed ratios in response to a shadow portion discriminated by said first comparing means.

10. An apparatus in accordance with claim 7, further including:

means for producing a contrast signal in accordance with the difference between said multi-gradation image signal and said unsharp signal; and second comparing means for comparing said contrast signal with at least one prescribed reference value to discriminate whether said portion of said original is a low contrast portion;

said signal producing means including means for producing a signal that is unsharp when said portion is discriminated by said first and second comparing means to be a low contrast shadow portion.

11. An apparatus in accordance with claim 7, wherein said unsharp signal producing means includes means for producing an unsharp signal for a prescribed area of said original by averaging said multi-gradation image signal over said prescribed area of 12. An apparatus in accordance with claim 11, wherein said at least one prescribed reference value is a plurality of reference values, and said unsharp signal producing means includes means for changing a size of said prescribed area in response to a shadow portion discriminated by said first comparing means.

* * * * *